United States Patent [19]

Maciejewski

[11] Patent Number: 5,449,053
[45] Date of Patent: Sep. 12, 1995

[54] VIBRATION DAMPENER

[75] Inventor: Wendell C. Maciejewski, Salem, Conn.

[73] Assignee: The United States of America as represented by the Secretary of the Navy, Washington, D.C.

[21] Appl. No.: 155,606

[22] Filed: Nov. 22, 1993

[51] Int. Cl.$^6$ .................................... F16F 15/023
[52] U.S. Cl. ............................ 188/267; 267/140.15; 252/572
[58] Field of Search ............ 188/267, 268, 322.5; 267/130, 136, 140.14, 140.15, 152, 153, 292; 252/73, 572

[56] References Cited

U.S. PATENT DOCUMENTS

| | | | |
|---|---|---|---|
| 3,970,573 | 7/1976 | Westhaver | 252/73 |
| 4,773,632 | 9/1988 | Hartel | 188/267 X |
| 4,923,057 | 5/1990 | Carlson et al. | 188/267 X |
| 5,194,181 | 3/1993 | Reitz | 252/572 X |
| 5,213,713 | 5/1993 | Reitz | 252/73 X |
| 5,267,633 | 12/1993 | Endo et al. | 188/267 |

*Primary Examiner*—Robert J. Oberleitner
*Assistant Examiner*—Alfred Muratori
*Attorney, Agent, or Firm*—Michael J. McGowan; Michael F. Oglo; Prithvi C. Lall

[57] ABSTRACT

There is disclosed a vibration dampener comprising a body for disposition between two relatively movable members, the body being formed from a carrier of a gel material and particles having electrorheological properties embedded in the carrier with the particles electrically aligned and pseudo-bonded. Upon a displacement force being applied to the body, as by one of the members, the particles resist motion relative to other of the particles. There is further disclosed a method for making the aforesaid vibration dampener wherein the dampener has a current passed through it while the carrier cures into a gel material.

6 Claims, 3 Drawing Sheets

VIBRATION DAMPENER

STATEMENT OF GOVERNMENT INTEREST

The invention described herein may be manufactured and used by or for the Government of the United States of America for government purposes without payment of any royalties thereon or therefor.

BACKGROUND OF THE INVENTION (1) Field of the Invention

This invention relates to vibration dampeners, and is directed particularly to a molded dampener of gel material, the dampener having no fluid component and requiring no housing.

(2) Description of the Prior Art

Electrorheological (ER) fluids are adapted to transform from a fluid to a semi-solid, or pasty substance, capable of resisting an applied stress, when the fluid is activated by an electric potential. When the electric potential is removed, the semi-solid substance reverts to the original fluid. ER fluids are two-phase systems containing micron sized particles suspended in a carrier fluid. When the ER fluid is subjected to an electric field, the particles polarize and develop a network of three dimensional chains. The ER fluid develops an electric field dependent yield stress, when activated by an electric field. In the activated state, the ER fluid turns semi-solid, and resists an applied shear stress, providing the applied load does not exceed the developed yield stress. The activation time from the fluid state to the semi-solid stress resistant state is typically on the order of milliseconds. The many applications of such fluids includes use in clutches, viscous dampers, valves and active engine mounts.

There have been developed systems for the dissipation of vibrational energy through the interaction between a plunger mechanism and the ER fluid. The ER fluid properties are actively altered by the magnitude of an electric field applied; thus, the response of the structure readily may be altered and controlled.

Devices designed to employ ER fluids suffer from the requirement of a fluid and a container for housing the fluid in a leak-proof manner. Further, in all fluids employed, the particles tend to settle to the bottom of the housing. Once the particles have settled to the bottom of the fluid, in order to be effective, the mixture must be remixed before further use. Still further, the requirement of a housing dictates a set configuration and size of dampener, not amenable to change.

Accordingly, there is a need for a vibration dampener which does not employ a fluid, and therefore has no particle settlement problem, and no requirement for a leak-proof container, or any container. A further need exists for a dampener which easily can be configured and sized to a particular application.

SUMMARY OF THE INVENTION

An object of the present invention is, therefore, to provide a vibration dampener having no fluid component and no housing component.

A further object of the invention is to provide a vibration dampener of ER material in which the particles are prevented from settling to the bottom of the dampener.

A still further object of the invention is to provide such a dampener as can be molded into any desired shape and size and can thereafter be reduced to another selected shape and size.

With the above and other objects in view, as will hereinafter appear, a feature of the present invention is the provision of a vibration dampener comprising a body for disposition between two relatively movable members, the body including a carrier comprising a gel material, and particles embedded in the carrier and electrically aligned and pseudo-bonded. Upon displacement force being applied to the body, as by one of the members, the particles resist motion relative to other of the particles.

In accordance with a further feature of the invention, there is provided a method for making a vibration dampener, the method including the steps of mixing a gelable fluid material with particulate material to suspend the particulate material in the fluid material, pouring the resulting mix into a mold, the mold being at least in part electrically conductive, and placing the mold in a vacuum. Electrical current, applied with a potential of about 2,000 volts, passes through the material in the mold to electrically align and pseudo-bond particles of the particulate material, causing stiffening of the fluid material. The electrical current is maintained for a period in which the fluid cures to a gel consistency, and is then removed from the mold as a gel material with the aligned and pseudo-bonded particles embedded therein.

The above and other features of the invention, including various novel details of construction and combinations of parts, will now be more particularly described with reference to the accompanying drawings and pointed out in the claims. It will be understood that the particular device and method embodying the invention is shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its' novel features and advantages will be apparent. In the drawings.

DESCRIPTION OF THE PREFERRED EMBODIMENTS

Figure 1:
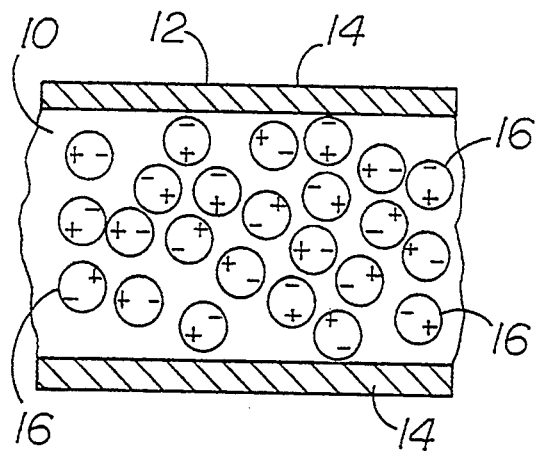
FIG. 1 is a diagrammatical illustration of an ER fluid in a mold.

In FIG. 1, there is shown diagrammatically an electrorheological (ER) fluid 10 in a mold 12, at least a portion 14 of which is of electrically conductive material, such as steel. The ER fluid is a gelable material, such as a low-durometer gel-type urethane. One material found suitable as a fluid for the present invention is sold by 3M Company under the trade name "4441 Gella". The fluid 10 serves as a carrier for discrete particles 16, which may be cornstarch. A mixture which has been found suitable for the purposes of this invention comprises 50 milliliters (ml) of cornstarch, 50 ml of 4441 Gella Part A and 50 ml 4441 Gella Part B (urethane). The cornstarch and urethane parts A and B are mixed together and poured into the mold 12. As is illustrated in FIG. 1, the particles 16 are suspended in random fashion, mechanically and electrically, in the fluid 10. The mold 12 is then placed under a vacuum for the purpose of drawing any trapped air from the fluid 10.

Figure 2:
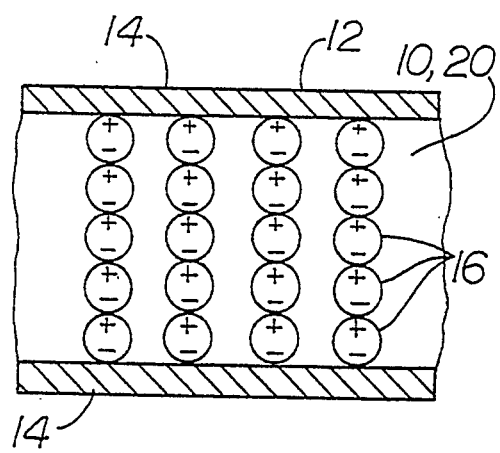
FIG. 2 is similar to FIG. 1, but shows the alignment of particles in the ER fluid upon application of an electric potential to the mold.

An electric potential, on the order of 2,000 volts, is then applied to the mold. Referring to FIG. 2, it will be seen that the resultant current flow through the mix causes the particles 16 therein to align themselves within the fluid and to electrically bond together, which results in a "stiffness" being imparted to the fluid 10. It will be appreciated that the property of urethane allowing the particles to freely align themselves with the applied electrical potential is important to this invention. If the electric charge is terminated after only a few seconds or minutes, the fluid 10 immediately reverts to its fluid-like consistency and behavior.

In accordance with the present invention, the electrical charge is maintained for about 30-60 minutes or longer. The mold remains closed for a period of several hours, up to about twenty-four hours, during which time the fluid cures to a gel consistency. Once cured, the gel is sufficiently "stiff" to prevent the particles 16 from departing from their aligned and pseudo-bonded positions and from settling to the bottom of the gel. Higher voltage may be used and, it appears, results in increased stiffness in the gel. The application of voltage to the mold may be continued beyond the 30-60 minutes and, in fact, may be applied during the entire curing period, though it appears that such is not necessary and that voltage application of roughly 30-60 minutes serves to effect the desired orientation of the particles.

Insofar as presently understood, the presence of the electrical field during curing of the carrier causes both alignment and, because the mix is mechanically "set" in aligned condition, a pseudo-bonding of the particles. As understood, it is this alignment and pseudo-bonding of particles which is instrumental in providing the desired shear damping characteristics.

Figure 3:
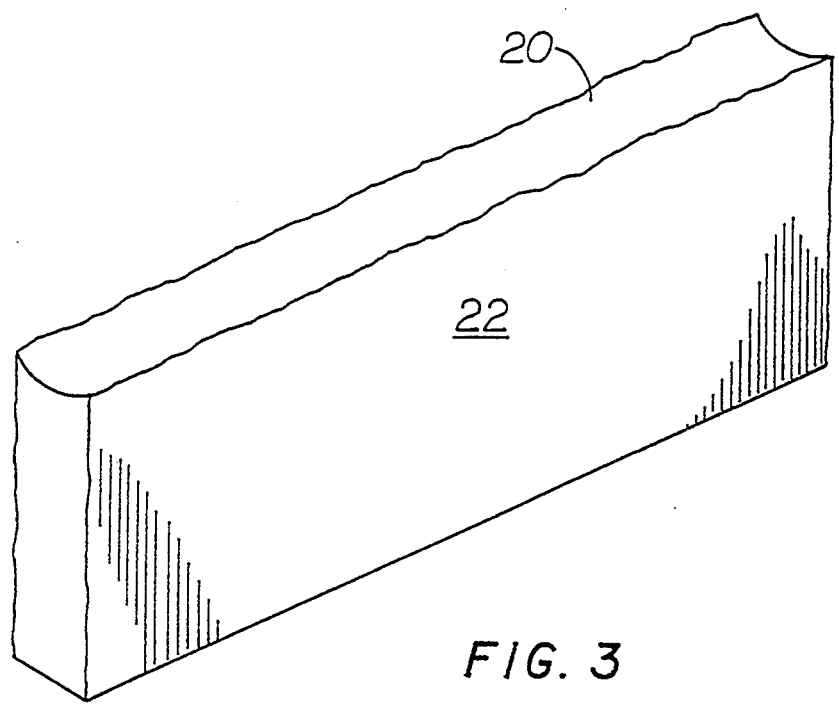
FIG. 3 is a perspective view of a vibration dampener, illustrative of an embodiment of the invention.

After completion of curing, the ER gel 20 may be removed from the mold 12 and easily handled and cut to any desired configuration and size. In FIG. 3, there is shown a molded body 22 of gel. The desired shape and size of body may be molded directly, or there may be molded a block of gel from which a desired body size and shape may be cut.

Figure 4:
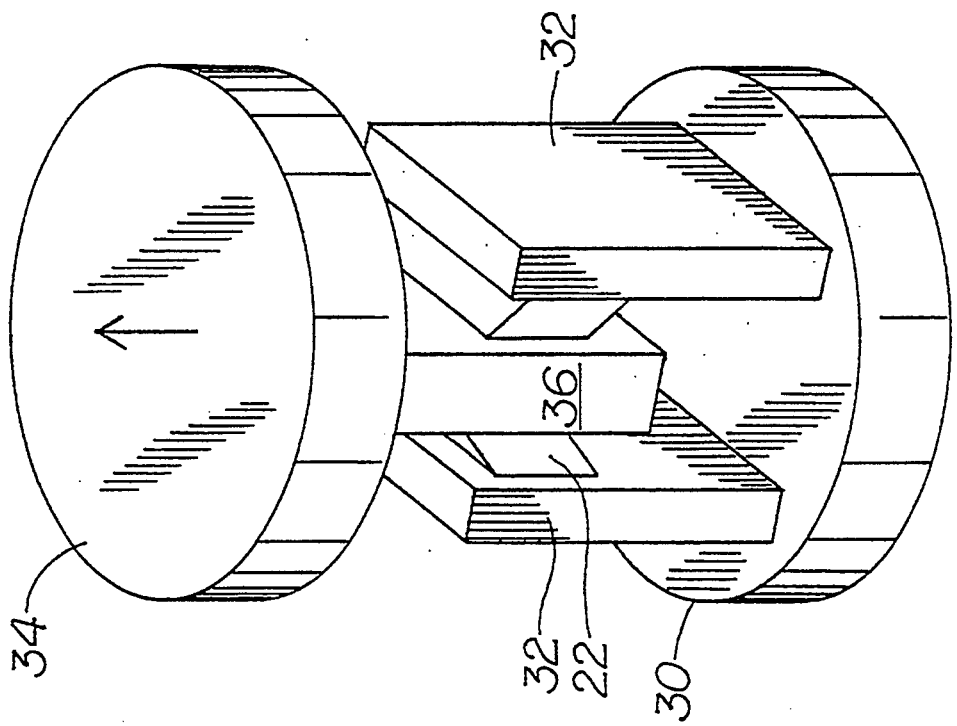
FIG. 4 is a perspective view of vibration dampeners, as shown in FIG. 3, in place between two relatively movable members.

Referring to FIG. 4, there is shown a stationary member 30 having upstanding panels 32 and a vibratory member 34 having a depending panel 36. Between panel 36 and panels 32, there are fixed bodies 22 of gel. The bodies 22 readily may be glued to the panels. In FIG. 4, members 30, 34, are shown at rest, or in a static condition.

Figure 5:
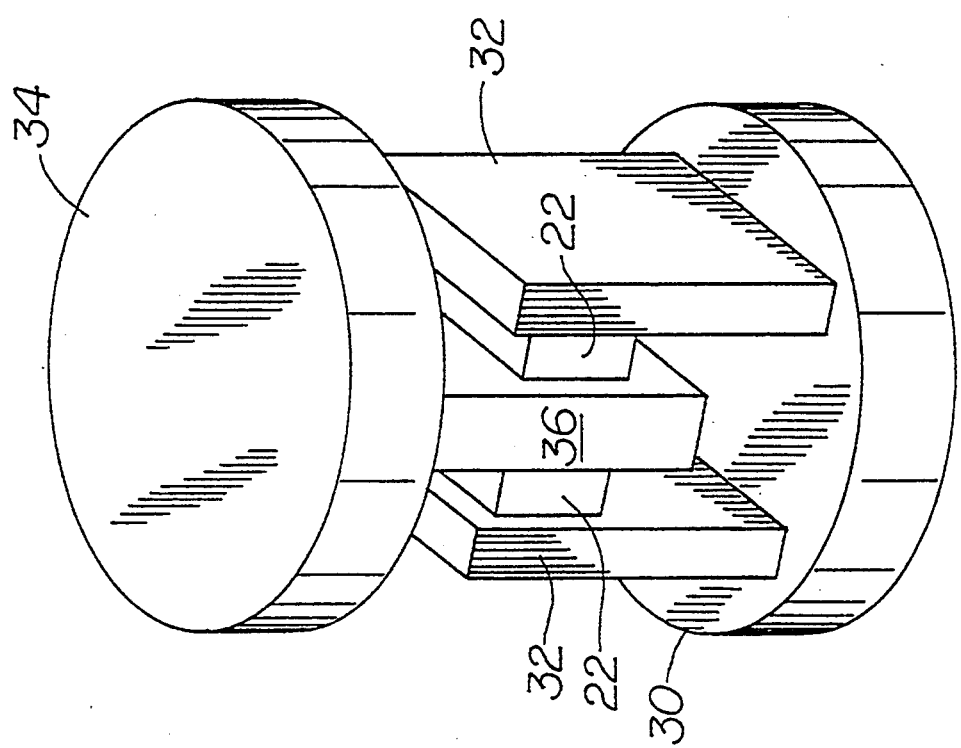
FIG. 5 is similar to FIG. 4, but shows the members displaced from each other.
Figure 6:
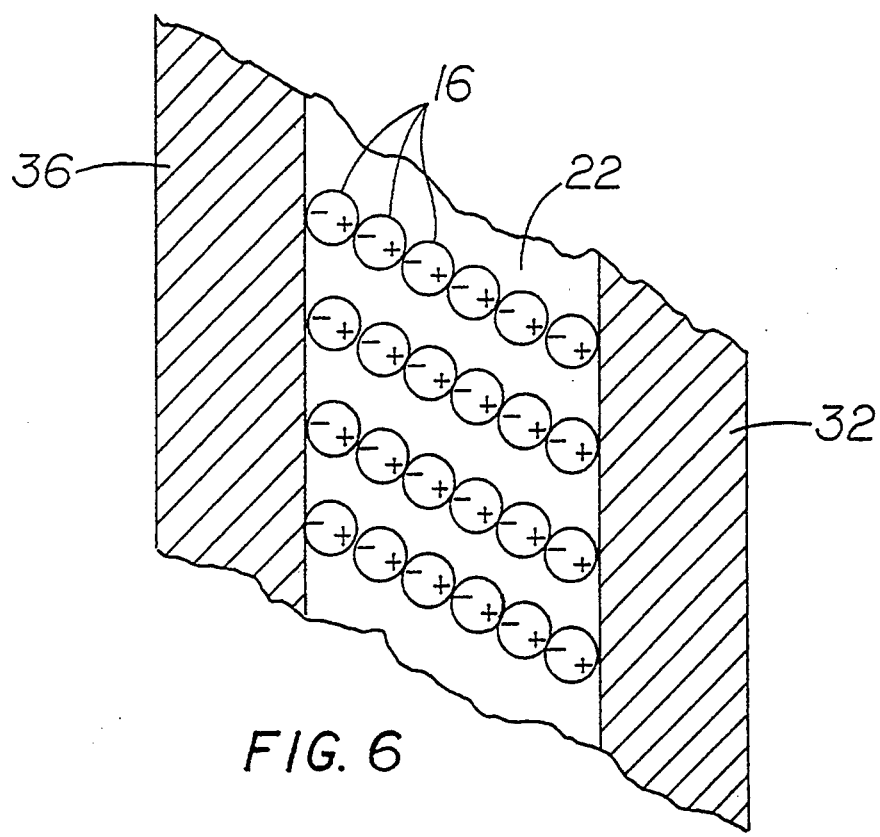
FIG. 6 is a diagrammatical illustration of the vibration dampeners under stress, as would be produced by the members displaced as shown in FIG. 4.

In FIG. 5, vibratory member 34 is shown displaced from stationary member 30. Referring to FIG. 6, it will be seen that particles 16 of body 22 retain their alignment and bond to resist shear forces.

Figure 7:
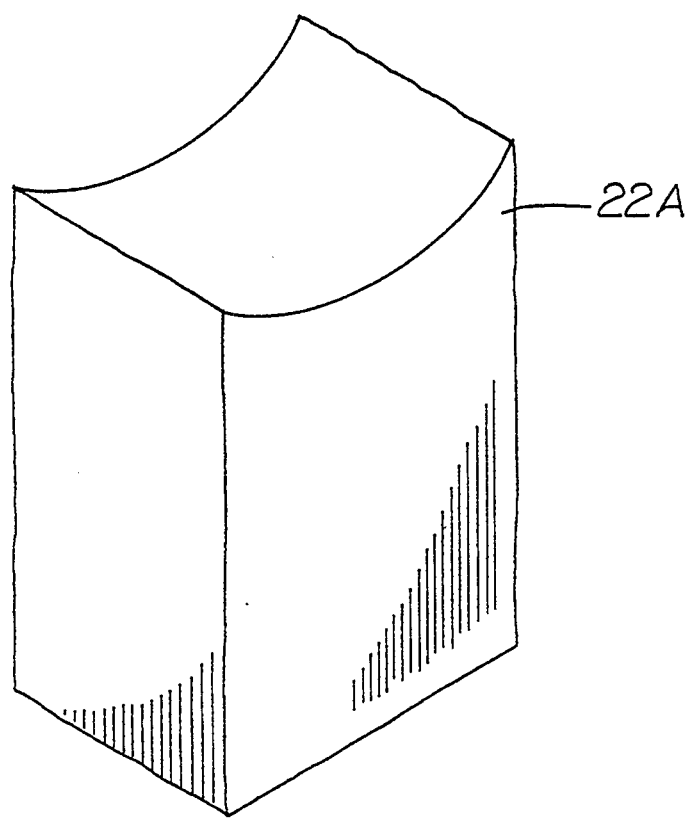
FIG. 7 is a perspective view of a vibration dampener cut from the dampener shown in FIG. 3.

Thus, there is provided a vibration dampener in the form of body 22, which does not employ a fluid, and in which settlement of particles is not permitted. The body requires no container and may be molded, and/or cut and sized for any application. In FIG. 7, there is shown a vibration dampener body 22a cut from the body 22 of FIG. 3.

It is to be understood that the present invention is by no means limited to the particular construction herein disclosed and/or shown in the drawings, but also comprises any modifications or equivalents within the scope of the claims. For example, in the above description, the ER fluid is described as a mixture of a urethane gel-type carrier and cornstarch particles; however, the invention is not limited to such specific materials. Other carriers and other particles may be used, which in turn, dictate other voltages and cure times for proper body consistency and shear resistance. The thrust of the invention is the combination of two materials, carrier material and particulate material, to form a body which resists shear and may be sized and shaped as needed, and used independently of a housing and fluid. Further, it has been found that the application of the electrical current field reduces the time for cure, which result is secondary to the primary invention objective of providing a damping material.

What is claimed is:

1. A vibration dampener comprising a solid body for disposition between and attachment to two relatively movable members, said body comprising:
   a carrier comprising a molded and cured gel material; and electrically conductive particles of electrorheological response material embedded in said carrier in electrically aligned position and pseudo-bonded one to another, said particles being permanently set in said aligned and pseudo-bonded positions, with chains of said aligned and pseudo-bonded particles being substantially evenly distributed throughout said body, such that upon displacement force being applied to said body by one of said members, said particles resist motion relative to other of said particles aligned with and pseudo-bonded thereto.

2. The dampener in accordance with claim 1 wherein said gel material is a urethane gel-type material.

3. The dampener in accordance with claim 2 wherein said particles are cornstarch.

4. The dampener in accordance with claim 1 wherein said body is substantially devoid of pockets of trapped air.

5. The dampener in accordance with claim 1 wherein said body is fixed to each of said members.

6. The dampener in accordance with claim 5 wherein said particles are aligned in an attitude substantially normal to surfaces of said members to which said body is fixed.

* * * * *